United States Patent
Lee et al.

(10) Patent No.: US 9,660,749 B2
(45) Date of Patent: *May 23, 2017

(54) METHOD FOR CONFIGURING A BACKHAUL LINK SUBFRAME IN A WIRELESS COMMUNICATION SYSTEM TO WHICH A CARRIER AGGREGATION SCHEME IS APPLIED AND AN APPARATUS FOR THE SAME

(71) Applicant: LG ELECTRONICS INC., Seoul (KR)

(72) Inventors: Seungmin Lee, Anyang-si (KR); Hakseong Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/202,094

(22) Filed: Jul. 5, 2016

(65) Prior Publication Data

US 2016/0315727 A1    Oct. 27, 2016

Related U.S. Application Data

(63) Continuation of application No. 14/815,224, filed on Jul. 31, 2015, now Pat. No. 9,413,512, which is a (Continued)

(51) Int. Cl.
*H04W 28/04* (2009.01)
*H04J 11/00* (2006.01)
(Continued)

(52) U.S. Cl.
CPC .......... *H04J 11/0069* (2013.01); *H04L 5/001* (2013.01); *H04L 5/0053* (2013.01);
(Continued)

(58) Field of Classification Search
CPC ..... H04W 80/04; H04W 88/06; H04W 28/04; H04W 72/04; H04W 74/04; H04B 7/2643; H04B 7/2656
See application file for complete search history.

(56) References Cited

U.S. PATENT DOCUMENTS

2010/0265870 A1    10/2010   Cai et al.
2011/0235554 A1    9/2011    Chen
(Continued)

FOREIGN PATENT DOCUMENTS

CN    101110658 A    1/2008
CN    101753198 A    6/2010
(Continued)

OTHER PUBLICATIONS

R1-090735, "Primary Component Carrier Selection, Monitoring, and Recovery," 3GPP TSG RAN WG1 #56 Meeting, Feb. 13, 2009, See section 3.
(Continued)

*Primary Examiner* — Andrew Lee
(74) *Attorney, Agent, or Firm* — Dentons US LLP

(57) ABSTRACT

A method for configuring a backhaul link subframe in a wireless communication system to which a carrier aggregation scheme is applied and an apparatus for the same are disclosed. The method comprises determining one of a plurality of subframe configurations as a first subframe configuration for a primary component carrier allocated to the relay node; configuring subframe configuration candidates for one or more secondary component carriers allocated to the relay node on the basis of the determined first subframe configuration; determining a second subframe configuration for each of the one or more secondary component carriers by using the configured subframe configuration candidates; and transmitting and receiving a signal to (Continued)

and from the relay node in accordance with the first subframe configuration and the second subframe configuration.

10 Claims, 12 Drawing Sheets

Related U.S. Application Data continuation of application No. 13/982,901, filed as application No. PCT/KR2012/000664 on Jan. 30, 2012, now Pat. No. 9,167,567.

(60) Provisional application No. 61/448,658, filed on Mar. 3, 2011.

(51) Int. Cl.
| | | |
|---|---|---|
| *H04L 5/00* | (2006.01) | |
| *H04L 5/14* | (2006.01) | |
| *H04W 72/12* | (2009.01) | |
| *H04W 76/04* | (2009.01) | |
| *H04W 72/04* | (2009.01) | |
| *H04L 25/22* | (2006.01) | |
| *H04W 88/02* | (2009.01) | |
| *H04W 88/08* | (2009.01) | |

(52) U.S. Cl.
CPC .............. *H04L 5/0055* (2013.01); *H04L 5/14* (2013.01); *H04L 25/22* (2013.01); *H04W 72/042* (2013.01); *H04W 72/0406* (2013.01); *H04W 72/0413* (2013.01); *H04W 72/1273* (2013.01); *H04W 76/046* (2013.01); *H04W 88/02* (2013.01); *H04W 88/08* (2013.01)

(56) References Cited

U.S. PATENT DOCUMENTS

| | | |
|---|---|---|
| 2011/0258016 A1 | 10/2011 | Barak et al. |
| 2012/0093059 A1 | 4/2012 | Bai et al. |
| 2012/0113907 A1 | 5/2012 | Baldemair et al. |
| 2012/0147810 A1 | 6/2012 | Wang et al. |
| 2012/0287828 A1 | 11/2012 | Chen et al. |
| 2013/0058264 A1 | 3/2013 | Gan et al. |
| 2013/0208686 A1 | 8/2013 | Zhang et al. |
| 2013/0242931 A1 | 9/2013 | Bi et al. |
| 2013/0279346 A1 | 10/2013 | Zhang |
| 2013/0286901 A1 | 10/2013 | Yuan et al. |

FOREIGN PATENT DOCUMENTS

| | | |
|---|---|---|
| CN | 101841846 A | 9/2010 |
| WO | 2010061053 A1 | 6/2010 |
| WO | 2010093143 A2 | 8/2010 |

OTHER PUBLICATIONS

3GPP TR 36.912 V9.3.0, "3rd Generation Partnership Project; Technical Specification Group Radio Access Network; Feasibility study for Further Advancements for E-UTRA; (LTE-Advanced) (Release 9)", Jun. 2010. See section 9.

3GPP TR 36.814 V9.0.0, "3rd Generation Partnership Project; Technical Specification Group Radio Access Network; Evolved Universal Terrestrial Radio Access (E-UTRA); Further Advancements for E-UTRA physical layer aspects (Release 9)", Mar. 2010. See section 9.

Fig. 2
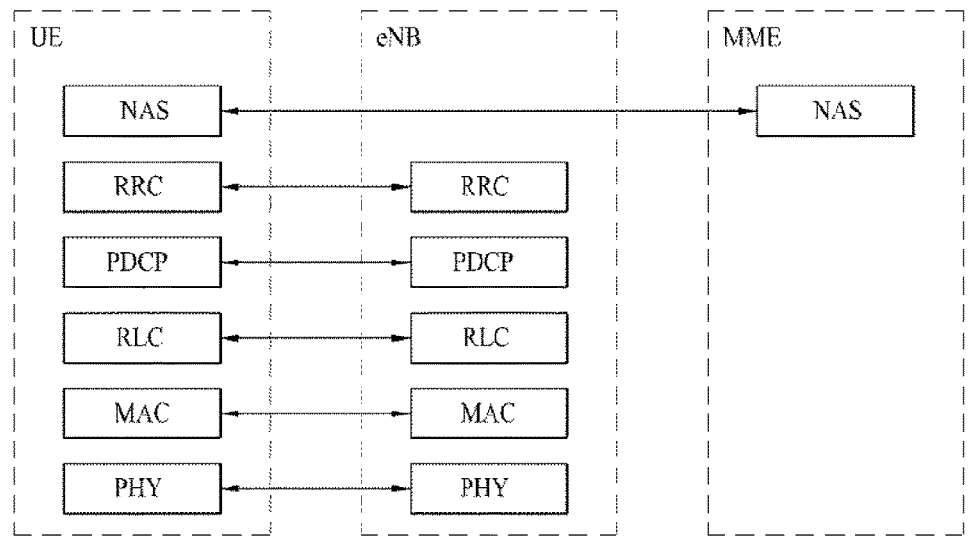
(a) control-plane protocol stack
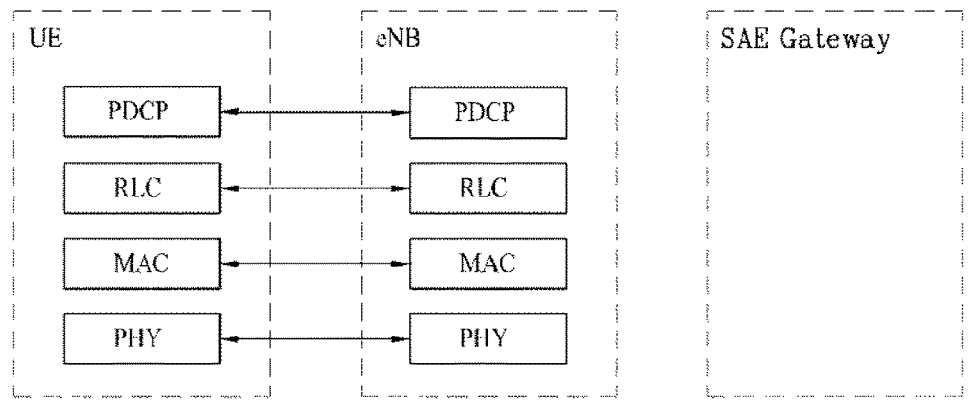
(b) user-plane protocol stack

METHOD FOR CONFIGURING A BACKHAUL LINK SUBFRAME IN A WIRELESS COMMUNICATION SYSTEM TO WHICH A CARRIER AGGREGATION SCHEME IS APPLIED AND AN APPARATUS FOR THE SAME

This application is a continuation of U.S. application Ser. No. 14/815,224 filed on Jul. 31, 2015, now allowed, which is a continuation of U.S. application Ser. No. 13/982,901, filed on Jul. 31, 2013, which is a 35 USC §371 National Stage entry of International Application No. PCT/KR2012/000664 filed on Jan. 30, 2012, which claims priority to U.S. Provisional Application No. 61/448,658 filed on Mar. 3, 2011, all of which are incorporated by reference in their entirety herein.

TECHNICAL FIELD

The present invention relates to a wireless communication system, and more particularly, to a method for configuring a backhaul link subframe in a wireless communication system to which a carrier aggregation scheme is applied, and an apparatus for the same.

BACKGROUND ART

A 3rd generation partnership project (3GPP) long term evolution (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS system, and its basic standardization is in progress under the 3rd Generation Partnership Project (3GPP). Generally, the E-UMTS may be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (eNode B and eNB), and an Access Gateway (AG) which is located at an end of a network (E-UTRAN) and connected to an external network. The base stations may simultaneously transmit multiple data streams for a broadcast service, a multicast service and/or a unicast service.

One or more cells may exist for one base station. One cell is set to one of bandwidths of 1.25, 2.5, 5, 10, and 20 Mhz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to indicate time and frequency domains to which data will be transmitted and information related to encoding, data size, hybrid automatic repeat and request (HARQ). Also, the base station transmits uplink (UL) scheduling information of uplink data to the corresponding user equipment to indicate time and frequency domains that can be used by the corresponding user equipment, and information related to encoding, data size, HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology is required for competitiveness in the future. In this respect, reduction of cost per bit, increase of available service, use of adaptable frequency band, simple structure, open type interface, proper power consumption of user equipment, etc. are required.

DISCLOSURE OF INVENTION

Technical Problem

Accordingly, based on the aforementioned discussion, an object of the present invention is to provide a method for configuring a backhaul link subframe in a wireless communication system to which a carrier aggregation scheme is applied and an apparatus for the same, which substantially obviate one or more problems due to limitations and disadvantages of the related art.

Solution to Problem

To achieve these objects and other advantages and in accordance with the purpose of the invention, as embodied and broadly described herein, in one aspect of the present invention, a method for configuring a backhaul link subframe for a relay node in a base station of a wireless communication system, to which a carrier aggregation scheme is applied, comprises determining one of a plurality of subframe configurations as a first subframe configuration for a primary component carrier allocated to the relay node; configuring subframe configuration candidates for one or more secondary component carriers allocated to the relay node on the basis of the determined first subframe configuration; determining a second subframe configuration for each of the one or more secondary component carriers by using the configured subframe configuration candidates; and transmitting and receiving a signal to and from the relay node in accordance with the first subframe configuration and the second subframe configuration.

In another aspect of the present invention, a base station in a wireless communication system, to which a carrier aggregation scheme is applied, comprises a processor determining one of a plurality of subframe configurations as a first backhaul subframe configuration for a primary component carrier allocated to a relay node, configuring subframe configuration candidates for one or more secondary component carriers allocated to the relay node on the basis of the determined first subframe configuration, and determining a second subframe configuration for each of the one or more secondary component carriers by using the configured subframe configuration candidates; and a wireless communication module transmitting and receiving a signal to and from the relay node in accordance with the first subframe configuration and the second subframe configuration.

Preferably, a subframe set based on the second subframe configuration is included in a subframe set based on the first subframe configuration.

More preferably, the plurality of subframe configurations are divided into a plurality of groups that include one or more subframe configurations, and the first subframe configuration and the second subframe configuration belong to one group.

In the aforementioned embodiments, a downlink control channel transmitted to the relay node through the primary component carrier includes information for scheduling at least one of a downlink data channel transmitted to the relay node through the one or more secondary component carriers and an uplink data channel received from the relay node.

In this case, an index of a subframe to which the downlink data channel is transmitted through the one or more secondary component carriers is the same as that of a subframe to which the downlink control channel is transmitted through the primary component carrier.

Advantageous Effects of Invention

According to the embodiments of the present invention, the backhaul link subframe may effectively be configured in the wireless communication system to which the carrier aggregation scheme is applied.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF DRAWINGS

FIG. 2 is a diagram illustrating structures of a control plane and a user plane of a radio interface protocol between a user equipment and E-UTRAN based on the 3GPP radio access network standard;

MODE FOR THE INVENTION

Figure 1:
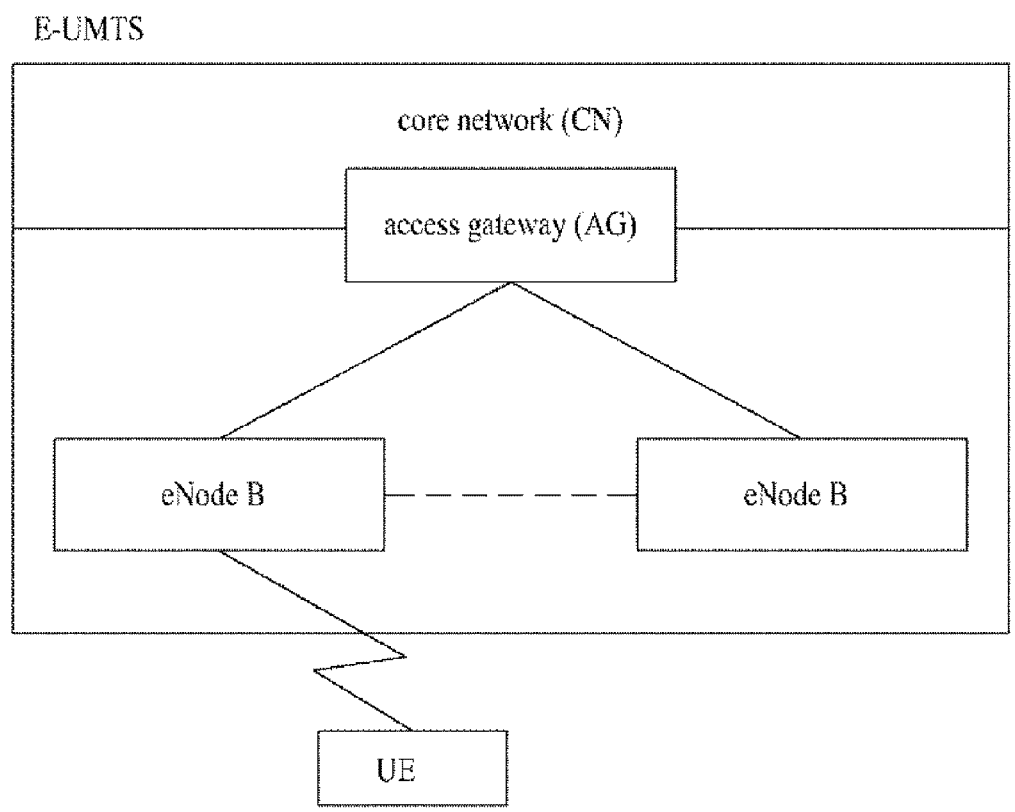
FIG. 1 is a diagram illustrating a network structure of an Evolved Universal Mobile Telecommunications System (E-UMTS) which is an example of a mobile communication system.

Hereinafter, structures, operations, and other features of the present invention will be understood readily by the preferred embodiments of the present invention, examples of which are illustrated in the accompanying drawings. Embodiments described later are examples in which technical features of the present invention are applied to a 3GPP system.

Although the embodiment of the present invention will be described based on the LTE system and the LTE-A system, the LTE system and the LTE-A system are only exemplary and the present invention may be applied to all communication systems corresponding to the aforementioned definition.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control layer above the physical layer via a transport channel. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control layer of the second layer provides a service to a radio link control (RLC) layer above the MAC layer via logical channels. The RLC layer of the second layer supports reliable data transfer. The RLC layer may be implemented as a functional block inside the MAC layer. In order to effectively transmit IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers to be in charge of controlling the logical, transport and physical channels. In this case, the radio bearer (RB) means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in RRC connected mode. If not so, the user equipment is in RRC idle mode. A non-access stratum (NAS) layer located above the RRC layer performs functions such as session management and mobility management.

One cell constituting a base station (eNB) is set to one of bandwidths of 1.25, 2.5, 5, 10, 15, and 20 Mhz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
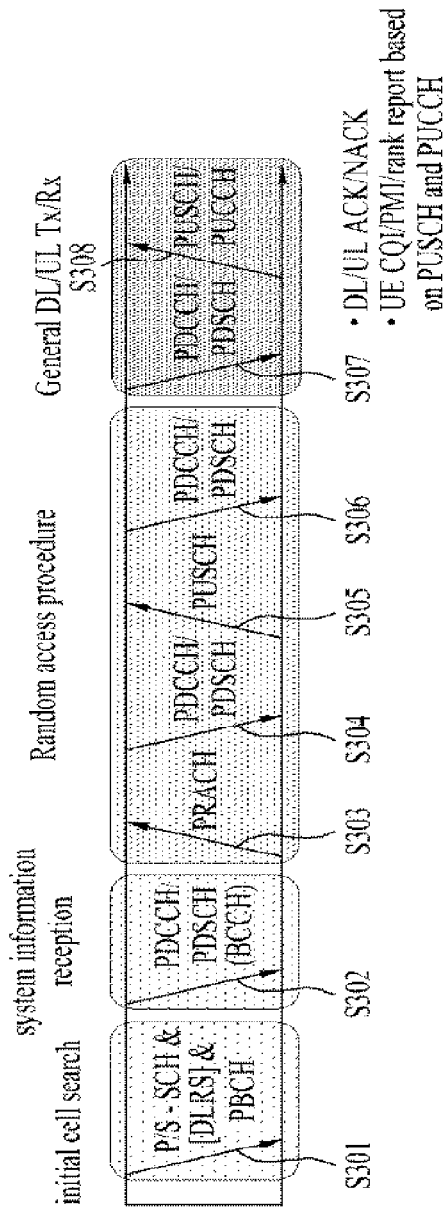
FIG. 3 is a diagram illustrating physical channels used in a 3GPP system and a general method for transmitting a signal using the physical channels.

FIG. 3 is a diagram illustrating physical channels used in a 3GPP system and a general method for transmitting a signal using the physical channels.

The user equipment performs initial cell search such as synchronizing with the base station when it newly enters a cell or the power is turned on (S301). To this end, the user equipment may synchronize with the base station by receiving a primary synchronization channel (P-SCH) and a secondary synchronization channel (S-SCH) from the base station, and acquire information of cell ID, etc. Afterwards, the user equipment may acquire broadcast information within the cell by receiving a physical broadcast channel from the base station. Meanwhile, the user equipment may identify the status of a downlink channel by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH (S302).

Meanwhile, if the user equipment initially accesses the base station, or if there is no radio resource for signal transmission, the user equipment may perform a random access procedure (RACH) for the base station (S303 to S306). To this end, the user equipment may transmit a preamble of a specific sequence through a physical random access channel (PRACH) (S303 and S305), and may receive a response message to the preamble through the PDCCH and the PDSCH corresponding to the PDCCH (S304 and S306). In case of a contention based RACH, a contention resolution procedure may be performed additionally.

The user equipment which has performed the aforementioned steps receives the PDCCH/PDSCH (S307) and transmits a physical uplink shared channel (PUSCH) and a physical uplink control channel (PUCCH) (S308), as a general procedure of transmitting uplink/downlink signals. In particular, the user equipment receives downlink control information (DCI) through the PDCCH. In this case, the DCI includes control information such as resource allocation information for the user equipment, and has different formats depending on its usage.

In the mean time, control information transmitted from the user equipment to the base station or received from the base station to the user equipment through the uplink includes downlink/uplink ACK/NACK signals, a channel quality indicator (CQI), a precoding matrix index (PMI), and a rank indicator (RI). In case of the 3GPP LTE system, the user equipment may transmit the aforementioned control information such as CQI/PMI/RI through the PUSCH and/or the PUCCH.

Figure 4:
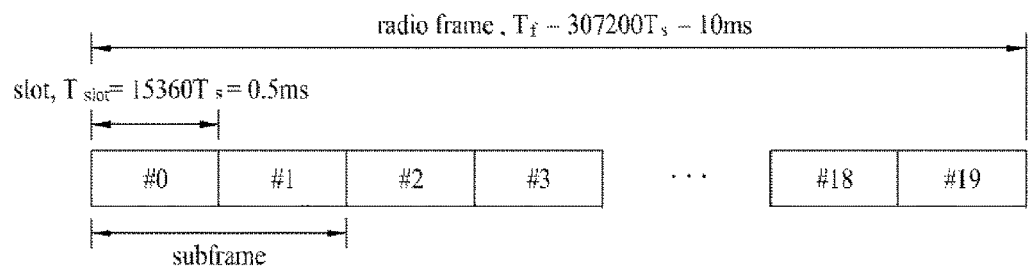
FIG. 4 is a diagram illustrating a structure of a radio frame used in an LTE system.

FIG. 4 is a diagram illustrating a structure of a radio frame used in an LTE system.

Referring to FIG. 4, the radio frame has a length of 10 ms (327200×Ts) and includes 10 subframes of an equal size. Each sub frame has a length of 1 ms and includes two slots. Each slot has a length of 0.5 ms (15360×Ts). In this case, Ts represents a sampling time, and is expressed by Ts=1/(15 kHz×2048)=3.2552×10$^{-8}$ (about 33 ns). The slot includes a plurality of OFDM symbols in a time domain, and includes a plurality of resource blocks (RBs) in a frequency domain. In the LTE system, one resource block includes 12 subcarriers×7 (or 6) OFDM symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols included in the slot.

Figure 5:
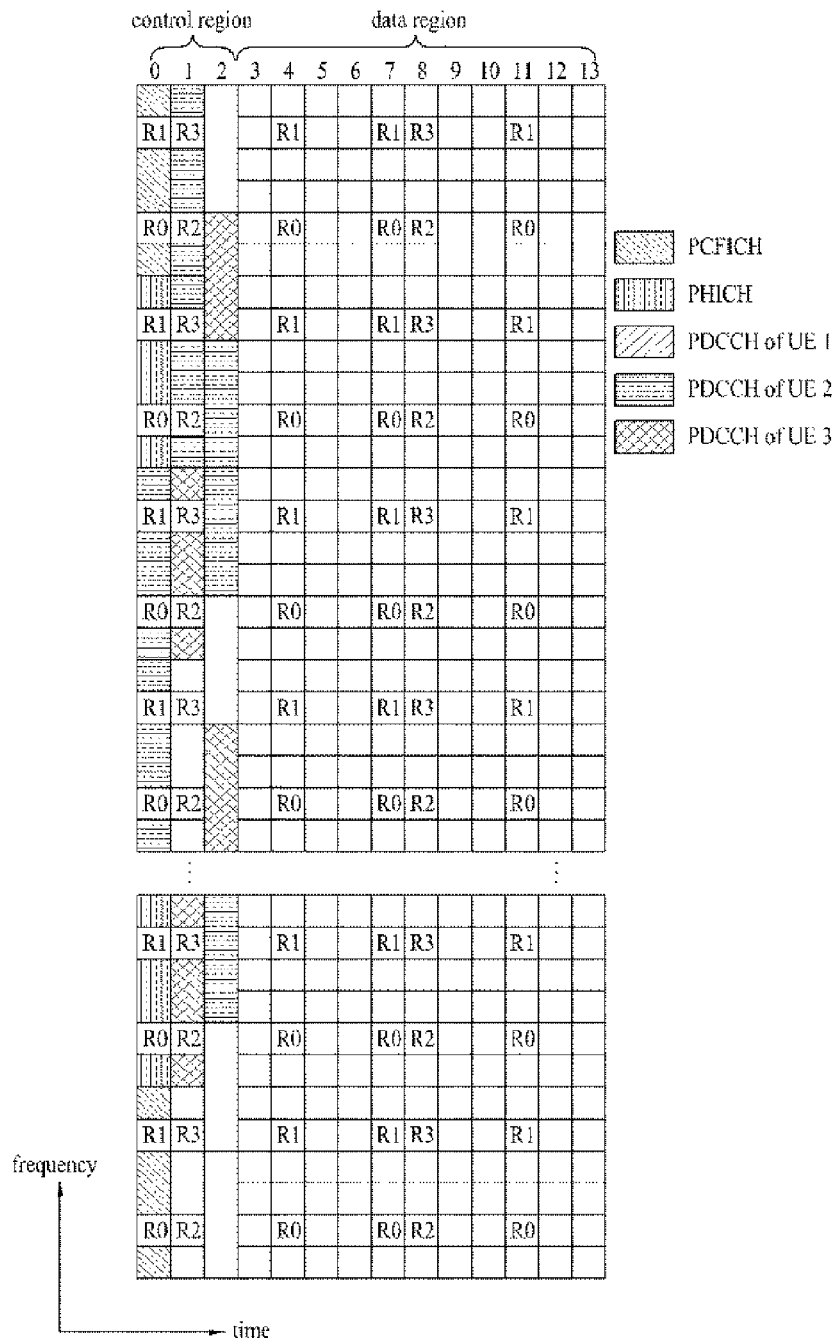
FIG. 5 is a diagram illustrating a structure of a downlink radio frame used in an LTE system.

FIG. 5 is a diagram illustrating a control channel included in a control region of one subframe in a downlink radio frame.

Referring to FIG. 5, the subframe includes fourteen (14) OFDM symbols. First one to three OFDM symbols are used as the control region in accordance with subframe configuration, and the other thirteen to eleven OFDM symbols are used as the data region. In FIG. 5, R1 to R4 represent reference signals (RS) (or pilot signals) of antennas 0 to 3. The RS is fixed by a given pattern within the subframe regardless of the control region and the data region. The control channel is allocated to a resource to which the RS is not allocated in the control region, and a traffic channel is also allocated to a resource to which the RS is not allocated in the data region. Examples of the control channel allocated to the control region include a Physical Control Format Indicator Channel (PCFICH), a Physical Hybrid-ARQ Indicator Channel (PHICH), and a Physical Downlink Control Channel (PDCCH).

The PCFICH notifies the user equipment of the number of OFDM symbols used in the PDCCH per subframe. The PCFICH is located in the first OFDM symbol and set prior to the PHICH and the PDCCH. The PCFICH includes four resource element groups (REG), each REG being distributed in the control region based on cell identity (cell ID). One REG includes four resource elements (REs). The RE represents a minimum physical resource defined by one subcarrier×one OFDM symbol. The PCFICH value indicates a value of 1 to 3 or a value of 2 to 4 depending on a bandwidth, and is modulated by Quadrature Phase Shift Keying (QPSK).

The PHICH is a physical hybrid-automatic repeat and request (HARQ) indicator channel and is used to transmit HARQ ACK/NACK signals for uplink transmission. Namely, the PHICH represents a channel where DL ACK/NACK information for UL HARQ is transmitted. The PHICH includes one REG, and is cell-specifically scrambled. The ACK/NACK signals are indicated by 1 bit, and are modulated by binary phase shift keying (BPSK). The modulated ACK/NACK are spread by a spreading factor (SF)=2 or 4. A plurality of PHICHs may be mapped with the same resource and constitute a PHICH group. The number of PHICHs multiplexed in the PHICH group is determined by the number of spreading codes. The PHICH (group) is repeated three times to obtain diversity gain in the frequency domain and/or the time domain.

The PDCCH is allocated to first n number of OFDM symbols of the subframe, wherein n is an integer greater than 1 and is indicated by the PCIFCH. The PDCCH includes one or more CCEs. The PDCCH notifies each user equipment or user equipment group of information related to resource allocation of transport channels, i.e., a paging channel (PCH) and a downlink-shared channel (DL-SCH), uplink scheduling grant, HARQ information, etc. The PCH and the DL-SCH are transmitted through the PDSCH. Accordingly, the base station and the user equipment respectively transmit and receive data through the PDSCH except for specific control information or specific service data.

Information as to user equipment(s) (one user equipment or a plurality of user equipments) to which data of the PDSCH are transmitted, and information as to how the user equipment(s) receives and decodes PDSCH data are transmitted by being included in the PDCCH. For example, it is assumed that a specific PDCCH is CRC masked with radio network temporary identity (RNTI) called "A," and information of data transmitted using a radio resource (for example, frequency location) called "B" and DCI format, i.e., transmission format information (for example, transport block size, modulation mode, coding information, etc.) called "C" is transmitted through a specific subframe. In this case, one or more user equipments located in a corresponding cell monitor the PDCCH using their RNTI information, and if there are one or more user equipments having RNTI called "A", the user equipments receive the PDCCH, and receive the PDSCH indicated by "B" and "C" through information of the received PDCCH.

In the mean time, if the channel status between the base station and the user equipment is poor, a relay node (RN) may be provided between the base station and the user equipment to provide a radio channel having more excellent channel status to the user equipment. Also, if the relay node is introduced from the base station in a cell edge region where the channel status is poor, whereby faster data channel may be provided and a cell service zone may be enlarged. As described above, nowadays, the relay node is widely used as the technique introduced to solve a propagation shaded zone in the wireless communication system.

The past technique of the relay node is limited to a function of a repeater that simply amplifies and transmits a signal, whereas the recent technique of the relay node has been developed to more intelligent technique. Moreover, the relay node technique is necessarily required to reduce enlargement cost of base stations and maintenance cost of a backhaul network in the next generation mobile communication system and at the same time improve service coverage enlargement and data processing rate. As the relay node technique is gradually developed, it is required that the relay node used in the wireless communication system according to the related art should be supported by a new wireless communication system.

In the 3GPP LTE-A (3rd Generation Partnership Project Long Term Evolution-Advanced) system, with forwarding of link connection between the base station and the user equipment to the relay node, two types of links having different attributes are applied to each of uplink and downlink carrier frequency bands. A connection link portion configured between links of the base station and the relay node may be defined as a backhaul link. Transmission of a frequency division duplex (FDD) mode or a time division duplex (TDD) mode based on downlink resources may be referred to as a backhaul downlink, and transmission of a FDD mode or TDD mode based on uplink resources may be referred to as a backhaul uplink.

Figure 6:
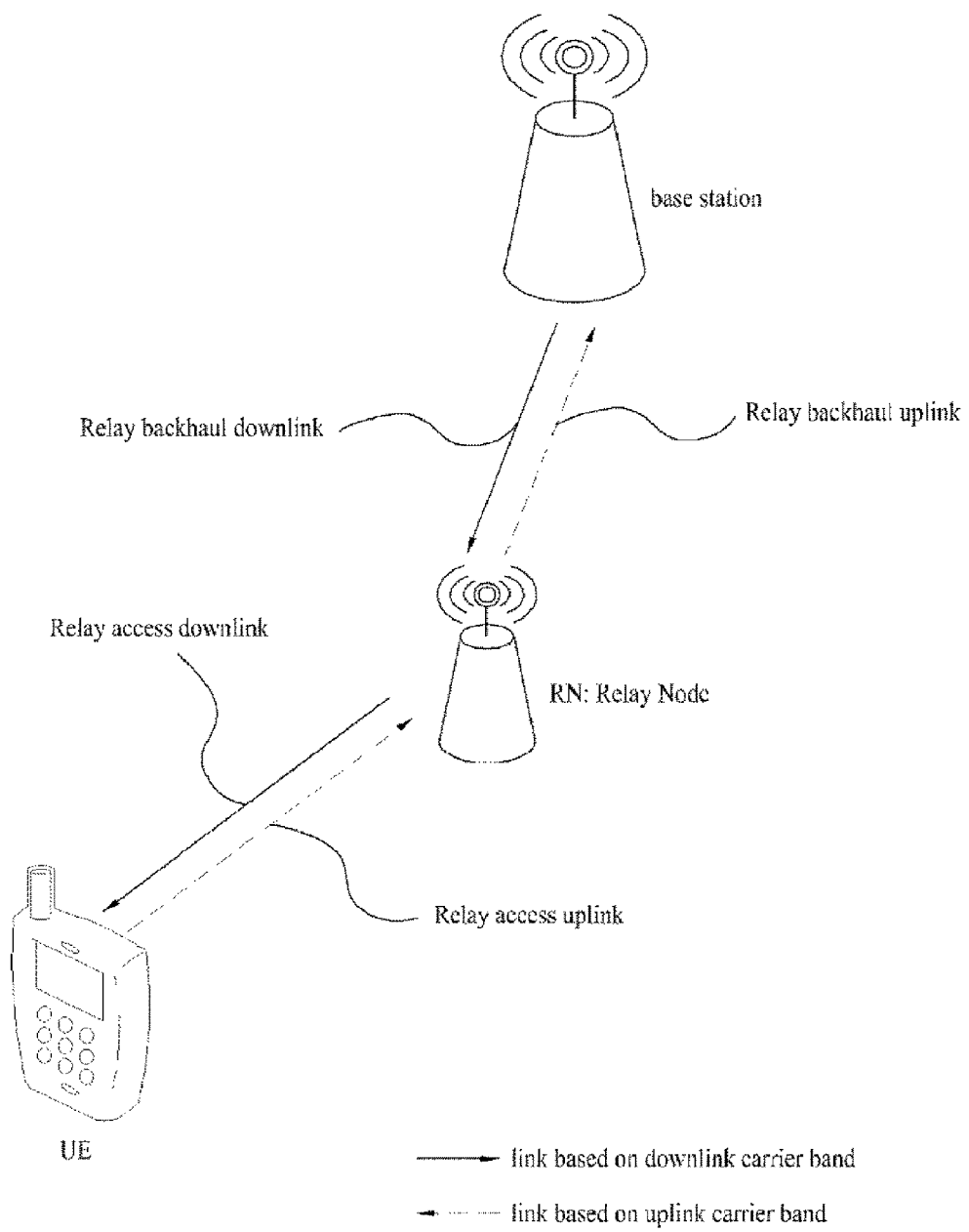
FIG. 6 is a diagram illustrating a relay backhaul link and a relay access link in a wireless communication system.

FIG. 6 is a diagram illustrating a relay backhaul link and a relay access link in a wireless communication system.

Referring to FIG. 6, as the relay node is introduced for forwarding of link connection between the base station and the user equipment, two types of links having different attributes are applied to each of uplink and downlink carrier frequency bands. A connection link portion configured between the base station and the relay node may be defined as a relay backhaul link. If transmission of the backhaul link is performed using a downlink frequency band (in case of frequency division duplex (FDD)) or a downlink subframe (in case of time division duplex (TDD)), the backhaul link may be referred to as a backhaul downlink. If transmission of the backhaul link is performed using an uplink frequency band (in case of FDD) or an uplink subframe (in case of TDD), the backhaul link may be referred to as a backhaul uplink.

On the other hand, a link connection portion configured between the relay node and a series of user equipments is defined as a relay access link. If transmission of the relay access link is performed using a downlink frequency band (in case of FDD) or a downlink subframe (in case of TDD), the relay access link may be referred to as an access downlink. If transmission of the relay access link is performed using an uplink frequency band (in case of FDD) or an uplink subframe (in case of TDD), the relay access link may be referred to as an access uplink.

The relay node (RN) may receive information from the base station through a relay backhaul downlink and transmit information to the base station through the relay backhaul uplink. Also, the relay node may transmit information to the user equipment through the relay access downlink and receive information from the user equipment through the relay access uplink.

In the mean time, in respect of band (or spectrum) use of the relay node, the case where the backhaul link is operated in the same frequency band as that of the access link will be referred to as 'in-band', and the case where the backhaul link and the access link operated in different frequency domains will be referred to as 'out-band'. In case of both in-band and out-band, the user equipment (hereinafter, referred to as legacy user equipment) operated in accordance with the existing LTE system (for example, release-8) should access a donor cell.

The relay node may be divided into a transparent relay node or a non-transparent relay node depending on whether the user equipment recognizes the relay node. The transparent relay node means that the user equipment fails to recognize communication with the network through the relay node. The non-transparent relay node means that the user equipment recognizes communication with the network through the relay node.

In respect of control of the relay node, a relay node configured as a part of the donor cell or a relay node controlling a cell by itself may be provided.

Although the relay node configured as a part of the donor cell has relay node identifier (ID), it does not have its cell identity. If at least a part of radio resource management (RRM) is controlled by the base station to which the donor cell belongs (even though the other portions of the RRM are located in the relay node), it may be referred to as the relay node configured as a part of the donor cell. Preferably, the relay node may support the legacy user equipment. For example, examples of this relay node may include various types of L2 (second layer) relay nodes, decode-and-forward relays and smart repeaters, and type-2 relay node.

In case of the relay node controlling a cell by itself, the relay node controls one or more cells, unique physical layer cell identity is provided to each of the cells controlled by the relay node, and the same RRM mechanism may be used. In view of the user equipment, there is no difference between access to the cell controlled by the relay node and access to the cell controlled by the base station. Preferably, the cell controlled by the relay node may support the legacy user equipment. For example, example of this relay node include a self-backhauling relay node, an L3 (third layer) relay node, a type-1 relay node and a type-1a relay node.

The type-1 relay node is an in-band relay node and controls a plurality of cells, each of which is regarded as a separate cell different from the donor cell in view of the user equipment. Also, each of the plurality of cells may have its physical cell ID (defined in LTE release-8), and the relay node may transmit its synchronization channel, reference signal, etc. In case of single-cell operation, the user equipment may directly receive scheduling information and HARQ feedback from the relay node and transmit its control channel (scheduling request (SR), CQI, ACK/NACK, etc.) to the relay node. Also, the type-1 relay node is regarded as the legacy base station (base station operated in accordance with the LTE release-8 system) by the legacy user equipments (user equipments operated in accordance with the LTE release-8 system). In other words, the type-1 relay node backward compatibility. Meanwhile, the type-1 relay node is regarded as another base station different from the legacy base station by the user equipments operated in accordance with the LTE-A system, whereby throughput may be improved.

The type-1a relay node has the same features as those of the aforementioned type-1 relay node except that it is operated in accordance with out-band. The operation of the type-1a relay node may be configured so as to be affected by the operation of L1 (first layer) within the minimum range, or may be configured so as not to be affected by the operation of L1 (first layer).

The type-2 relay node is an in-band relay node, and does not have separate physical cell ID, whereby a new cell is not formed. The type-2 relay node is transparent with respect to the legacy user equipment, and the legacy user equipment fails to recognize the presence of the type-2 relay node. Although the type-2 relay node may transmit the PDSCH, it does not transmit at least CRS and PDCCH.

In the mean time, in order that the relay node is operated in accordance with in-band, some resources in the time-frequency domains should be reserved for the backhaul link. In this case, the resources may be set so as not to be used for the access link. This will be referred to as resource partitioning.

The general principle in resource partitioning at the relay node may be described as follows. The backhaul downlink and the access downlink may be multiplexed on one carrier frequency in accordance with a time division multiplexing (TDM) mode (i.e., only one of the backhaul downlink or the access downlink is activated at specific time). Similarly, the backhaul uplink and the access uplink may be multiplexed on one carrier frequency in accordance with a TDM mode (i.e., only one of the backhaul uplink or the access uplink is activated at specific time).

In case of backhaul link multiplexing in the FDD mode, backhaul downlink transmission may be performed in a downlink frequency band, and backhaul uplink transmission may be performed in an uplink frequency band. In case of backhaul link multiplexing in the TDD mode, backhaul downlink transmission may be performed at a downlink subframe of the relay node and the base station, and backhaul uplink transmission may be performed at an uplink subframe of the relay node and the base station.

In case of an in-band relay node, for example, if backhaul downlink reception from the base station and access downlink transmission to the user equipment are simultaneously performed at a predetermined frequency band, a signal transmitted from a transmitter of the relay node may be received in a receiver of the relay node. As a result, signal interference or RF jamming may occur at RF front-end of the relay node. Similarly, if access uplink received from the user equipment and backhaul downlink transmission to the base station are simultaneously performed at a predetermined frequency band, signal interference may occur at RF front-end of the relay node. Accordingly, there is difficulty in performing simultaneous transmission and reception at one frequency band of the relay node unless a receiving signal and a transmitting signal are sufficiently spaced apart from each other (for example, a transmitting antenna and a receiving antenna are locally spaced apart from each other (e.g., ground/underground).

One solution for solving the above problem of signal interference is that the relay node is operated so as not to transmit a signal to the user equipment when receiving a signal from the donor cell. In other words, a gap may be generated for transmission from the relay node to the user equipment, and the user equipment (including legacy user equipment) may be set so as not to expect any transmission from the relay node for the gap. The gap may be set by configuring a multicast broadcast single frequency network (MBSFN).

Figure 7:
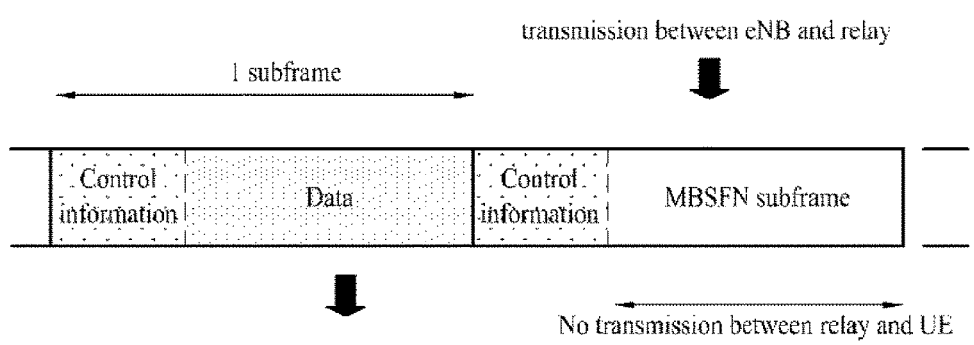
FIG. 7 is a diagram illustrating an example of relay node resource partitioning.

FIG. 7 is a diagram illustrating an example of relay node resource partitioning.

Referring to FIG. 7, the first subframe is a normal subframe, and a downlink (that is, access downlink) control signal and data are transmitted from the relay node to the user equipment. The second subframe is an MBSFN subframe, and a control signal is transmitted from the relay node to the user equipment in a control region of a downlink subframe but no signal is transmitted from the relay node to the user equipment in the other region of the downlink subframe. In this case, since the legacy user equipment expects transmission of a physical downlink control channel (PDCCH) from all downlink subframes (in other words, the relay node needs to support the legacy user equipments within its zone to receive the PDCCH per subframe and perform a measurement function), for normal operation of the legacy user equipment, it is required to transmit the PDCCH from all the downlink subframes. Accordingly, even on a subframe set for downlink (that is, backhaul downlink) transmission from the base station to the relay node, the relay node needs to perform access downlink transmission not backhaul downlink reception for first N (N=1, 2 or 3) OFDM symbol durations of the subframe. In this respect, since the PDCCH is transmitted from the relay node to the user equipment, backward compatibility for the legacy user equipment, which is served by the relay node, may be provided in a control region of the second subframe. The relay node may receive transmission from the base station in the other region of the second subframe for the time when no transmission from the relay node to the user equipment is performed. Accordingly, through this resource partitioning, access downlink transmission and backhaul downlink reception may not be performed at the same time in the in-band relay node.

The second subframe based on the MBSFN subframe will be described in more detail. The control region of the second subframe may be regarded as a relay node non-hearing interval. The relay node non-hearing interval means that the relay node does not receive a backhaul downlink signal but transmits an access downlink signal. This interval may be set to 1, 2, or 3 OFDM length as described above. For the relay node non-hearing interval, the relay node may perform access downlink transmission to the user equipment, and may receive backhaul downlink from the base station in the other regions. At this time, since the relay node cannot perform transmission and reception in the same frequency band at the same time, it requires time to switch a transmission mode of the relay node to a reception mode of the relay node. Accordingly, a guard time (GT) is required for first some interval of a backhaul downlink receiving zone, so that the relay node performs transmission/reception mode switching. Similarly, even in the case that the relay node is operated to receive a backhaul downlink from the base station and transmit an access downlink to the user equipment, a guard time (GT) for reception/transmission mode switching of the relay node may be set. The length of the guard time may be given by a value of a time domain. For example, the length of the guard time may be given by k (k≥1) time sample (Ts) values, or may be set by one or more OFDM symbol lengths. Also, the guard time of the last portion of the subframe may not be defined or set either if backhaul downlink subframes of the relay node are set continuously or depending on timing alignment of predetermined subframes. The guard time may be defined in a frequency domain only set for backhaul downlink subframe transmission, to maintain backward compatibility (if the guard time is set in the access downlink interval, the legacy user equipment cannot be supported). For the backhaul downlink reception interval except for the guard time, the relay node may receive the PDCCH and the PDSCH from the base station. The PDCCH and the PDSCH may be referred to as a relay-PDCCH (R-PDCCH) and a relay-PDSCH (R-PDSCH) in view of physical channels dedicated for the relay node.

Figure 8:
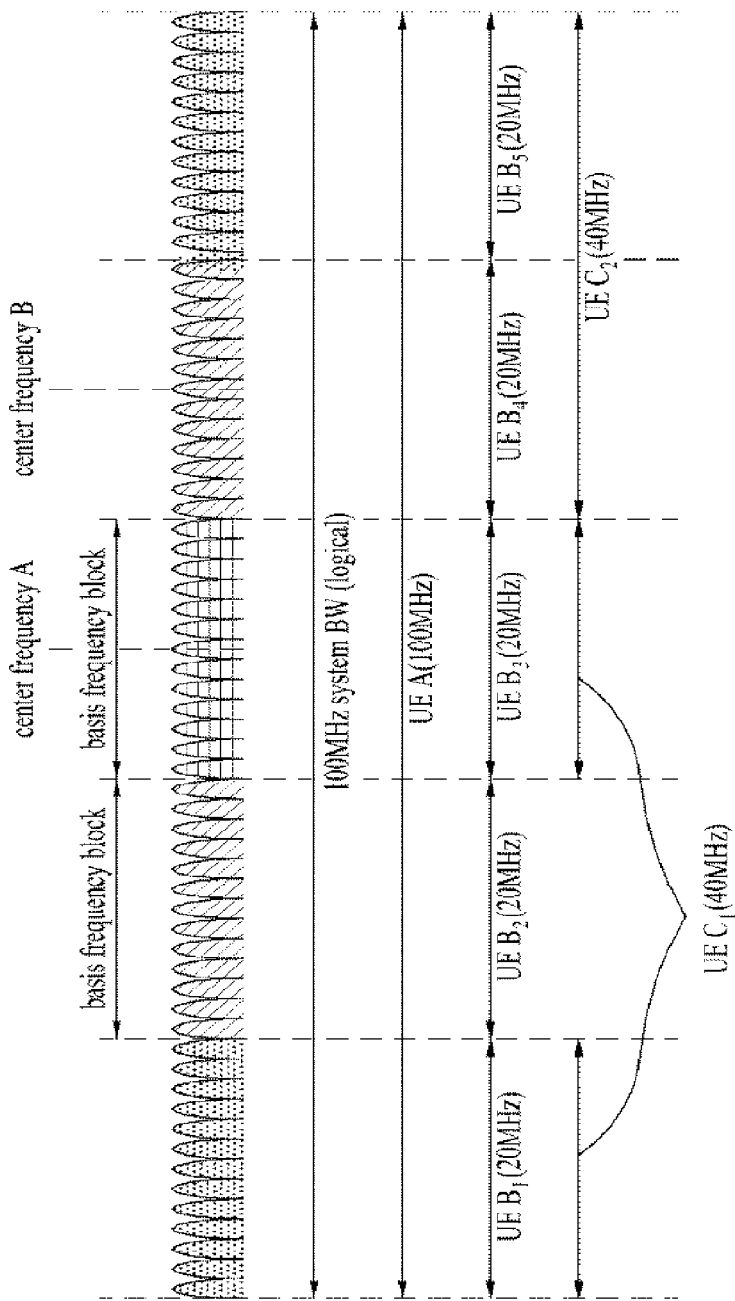
FIG. 8 is a conceptional diagram illustrating a carrier aggregation scheme.

Hereinafter, a carrier aggregation scheme will be described. FIG. 8 is a conceptional view illustrating carrier aggregation.

The carrier aggregation means that the user equipment uses a plurality of frequency blocks or (logical) cells, which include uplink resources (or component carriers) and/or downlink resources (or component carriers), as one large logical frequency band to enable a wireless communication system to use a wider frequency band. Hereinafter, for convenience of description, the carrier aggregation will be referred to as component carriers.

Referring to FIG. 8, a whole system bandwidth (system BW) is a logical band and has a bandwidth of 100 MHz. The whole system bandwidth includes 5 component carriers, each of which has a bandwidth of maximum 20 MHz. The component carrier includes at least one or more physically continuous subcarriers. Although the respective component carriers have the same bandwidth in FIG. 8, it is only exemplary, and the component carriers may have their respective bandwidths different from one another. Also, although the respective component carriers adjoin each other in the frequency domain as shown, the drawing just represents the logical concept. The respective component carriers may logically adjoin each other, or may be spaced apart from each other.

A center frequency may be used differently for each of the component carriers. Alternatively, one center carrier common for physically adjoining component carriers may be used. For example, assuming that all component carriers are physically adjacent to one another, a center carrier 'A' may be used. Assuming a case that the respective component carriers are not physically adjacent to each other, a center carrier 'A' for one component carrier, a center carrier 'B' for another component carrier, and the like may be used.

In this specification, a component carrier may correspond to a system bandwidth of a legacy system. By defining a component carrier based on a legacy system, it is possible to facilitate provision of backward compatibility and system design in a wireless communication environment in which an evolved user equipment and a legacy user equipment coexist. For example, in case that LTE-A system supports carrier aggregation, each component carrier can correspond to a system bandwidth of LTE system. In this case, the component carrier may have a bandwidth selected from the group including 1.25 MHz, 2.5 MHz, 5 MHz, 10 MHz and 20 MHz.

In case that a whole system band is extended by carrier aggregation, a frequency band used for communication with each user equipment is defined by a component carrier unit. A user equipment A may use a whole system bandwidth of 100 MHz and performs communication using five component carriers all. User equipments B1 to B5 may use a bandwidth of 20 MHz only, and each of the user equipments B1 to B5 performs communication using one component carrier. User equipment C1 and user equipment C2 may use a bandwidth of 40 MHz. Each of the user equipment C1 and the user equipment C2 performs communication using two component carriers. In this case, these two component carriers may be logically/physically adjacent to each other or may not. The user equipment C1 represents a case of using two component carriers that are not adjacent to each other. And, the user equipment C2 represents a case that two adjacent component carriers are used.

One downlink component carrier and one uplink component carrier are used in the LTE system, whereas several component carriers may be used as shown in FIG. 8 in the LTE-A system. At this time, a scheme of scheduling a data channel through a control channel may be divided into a linked carrier scheduling scheme of the related art and a cross carrier scheduling scheme.

In more detail, according to the linked carrier scheduling scheme, like the existing LTE system that uses a single component carrier, a control channel transmitted through a specific component carrier performs scheduling for a data channel only through the specific component carrier.

In the mean time, according to the cross carrier scheduling scheme, a control channel transmitted through a primary component carrier (CC) using a carrier indicator field (CIF) performs scheduling for a data channel transmitted through the primary component carrier or another component carrier.

The present invention suggests a method for efficiently designating subframe configuration per logical cell, i.e., cell (or component carrier) when the carrier aggregation scheme is applied to the backhaul link between a macro base station (MeNB) and a relay node (RN). However, the method described hereinafter may be applied between the relay node and a user equipment (RUE) of the relay node. Moreover, the method may be applied between the macro base station (MeNB) and a user equipment (MUE) of the macro base station.

First of all, subframe configuration of the backhaul link defined in the 3GPP LTE system based TDD system is as illustrated by Table 1 below.

TABLE 1

| SubframeConfigurationTDD | eNB-RN uplink-downlink configuration | Subframe number n | | | | | | | | | |
|---|---|---|---|---|---|---|---|---|---|---|---|
| | | 0 | 1 | 2 | 3 | 4 | 5 | 6 | 7 | 8 | 9 |
| 0 | 1 | | | | D | | | | U | | |
| 1 | | | | U | | | | | | | D |
| 2 | | | | | D | | | | U | D | |
| 3 | | | | | U | D | | | | | D |
| 4 | | | | | U | D | | | | U | D |
| 5 | 2 | | | U | | | | | | D | |
| 6 | | | | | D | | | | U | | |
| 7 | | | | U | | D | | | | D | |
| 8 | | | | | D | | | | U | | D |
| 9 | | | | U | D | D | | | | D | |
| 10 | | | | | D | | | | U | D | D |
| 11 | 3 | | | | U | | | | D | | D |
| 12 | | | | | U | | | | D | D | D |
| 13 | 4 | | | | U | | | | | | D |
| 14 | | | | | U | | | | D | | D |
| 15 | | | | | U | | | | | D | D |
| 16 | | | | | U | | | | D | D | D |
| 17 | | | | | U | D | | | D | D | D |
| 18 | 6 | | | | | U | | | | | D |

In Table 1, U means a subframe allocated to the backhaul uplink, and D means a subframe allocated to the backhaul downlink.

Also, the relay node in which uplink-downlink subframes are set by Table 1 detects PDSCH transmission from a subframe within n-k (k∈K) to transmit ACK/NACK response from an uplink subframe n. In this case, k is defined as illustrate in Table 2 below.

In this case, HARQ timing mismatch per cell (or component carrier) may occur, whereby a problem may occur in that uplink ACK/NACK transmission or PUSCH retransmission is not possible. For this reason, the cross carrier scheduling scheme may not be performed normally. The cross carrier scheduling scheme will be described with reference to the accompanying drawings.

TABLE 2

| SubframeConfigurationTDD | K according to subframe | | | | | | | | | |
|---|---|---|---|---|---|---|---|---|---|---|
| | n = 0 | n = 1 | n = 2 | n = 3 | n = 4 | n = 5 | n = 6 | n = 7 | n = 8 | n = 9 |
| 0 | | | | | | | | | | 4 |
| 1 | | | | 4 | | | | | | |
| 2 | | | | | | | | | 4, 9 | |
| 3 | | | | 4, 9 | | | | | | |
| 4 | | | | | 4 | | | | | 4 |
| 5 | | | 4 | | | | | | | |
| 6 | | | | | | | | | 4 | |
| 7 | | | 4, 8 | | | | | | | |
| 8 | | | | | | | | | 4, 8 | |
| 9 | | | 4, 8, 9 | | | | | | | |
| 10 | | | | | | | | | 4, 8, 9 | |
| 11 | | | | | 4, 6 | | | | | |
| 12 | | | | | 4, 5, 6 | | | | | |
| 13 | | | | | 4 | | | | | |
| 14 | | | | | 4, 6 | | | | | |
| 15 | | | | | 4, 5 | | | | | |
| 16 | | | | | 4, 5, 6 | | | | | |
| 17 | | | | | 4, 5, 6, 9 | | | | | |
| 18 | | | | | | 5 | | | | |

In the mean time, the carrier aggregation scheme is applied to the backhaul link, whereby uplink-downlink subframe configurations based on Table 1 may be applied to each of cells (or component carriers), i.e., uplink-downlink subframe configurations may be applied to all the cells (or component carriers) independently. Alternatively, the same uplink-downlink subframe configuration may be applied to some cells (or component carriers) or independent uplink-downlink subframe configurations may be applied to the other cells (or component carriers). The uplink-downlink subframe configurations may be designated by SubframeConfigurationTDD or SubframeConfigurationFDD.

Figure 9:
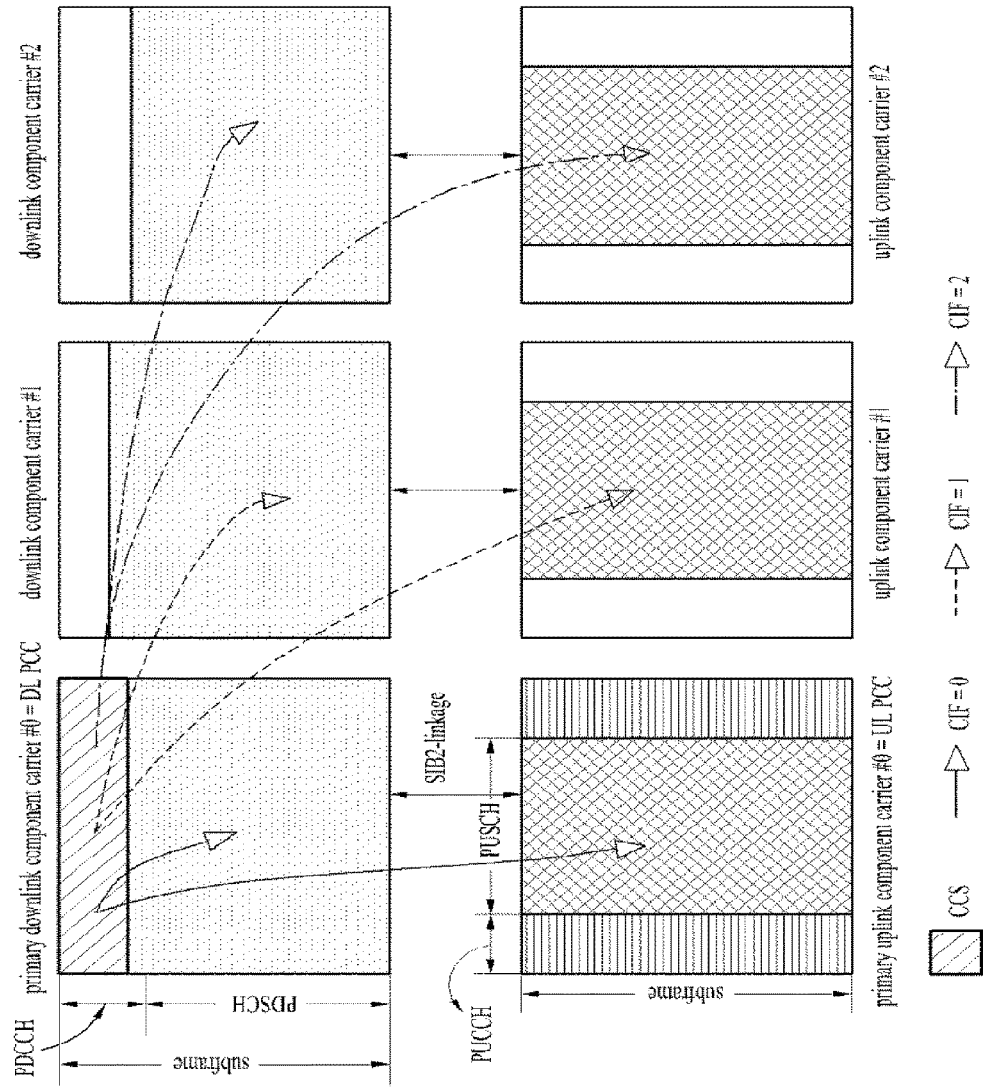
FIG. 9 is a diagram illustrating an application example of a cross carrier scheduling scheme.

FIG. 9 is a diagram illustrating an application example of a cross carrier scheduling scheme. In particular, in FIG. 9, the number of cells (or component carriers) allocated to the relay node is three, and the cross carrier scheduling scheme is performed using CIF as described above. In this case, it is assumed that a downlink cell (or component earner) #0 and an uplink cell (or component carrier) #0 are a primary downlink component carrier (i.e., primary cell (PCell)) and a primary uplink component carrier, respectively. It is also assumed that the other component carriers are secondary component carriers (i.e., secondary cell (SCell)).

Figure 10:
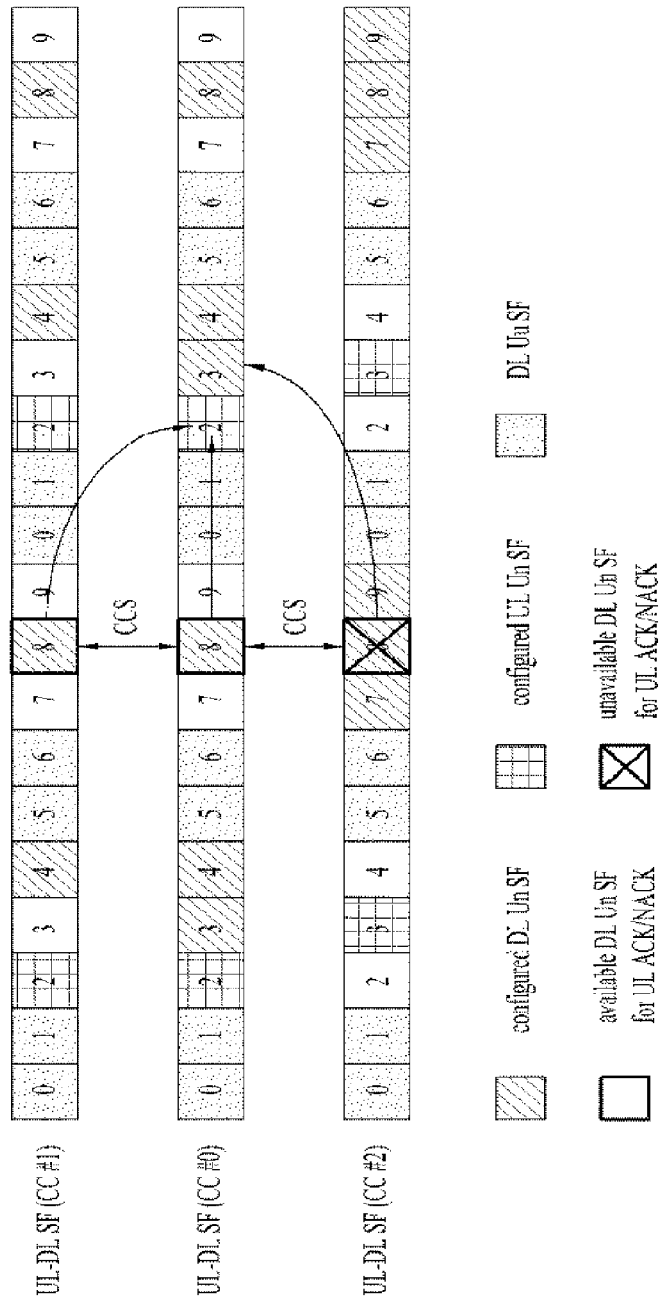
FIG. 10 is a diagram illustrating a problem that may occur when a cross carrier scheduling scheme is applied to a backhaul link of a TDD system.

Also, FIG. 10 is a diagram illustrating a problem that may occur when a cross carrier scheduling scheme is applied to a backhaul link of a TDD system. In particular, in FIG. 10, uplink-downlink subframe configurations (i.e., SubframeConfigurationTDD) per cell are independently RRC signaled in the backhaul link under the status of FIG. 9, and if a PDSCH or PUSCH of the other secondary component carriers (or SCell) including the PCell is scheduled from the primary component carrier (or PCell) through the cross carrier scheduling scheme, a problem of HARQ timing mismatch may occur.

Furthermore, in FIG. 10, it is assumed that SubframeConfigurationTDD of cell (or component carrier (CC)) #0, cell (or component carrier (CC)) #1, cell (or component carrier (CC)) #2 are "9", "7" and "12", respectively. Also, it is assumed that the macro base station (MeNB) performs scheduling for PDSCH of a (secondary) component carrier #1 and a (secondary) component carrier #2 through the cross carrier scheduling scheme at a backhaul downlink subframe #8 of a (primary) component carrier #0.

Referring to FIG. 10, under an environment where normal HARQ operation is possible, uplink ACK/NACK signals for a downlink subframe #8 (i.e., PDSCH) of a (secondary) component carrier #2, the (secondary) component carrier #1, and the (primary) component carrier #0 should be transmitted together through an uplink subframe #2 (i.e., PUCCH of uplink subframe #2) of the (primary) component carrier #0.

However, it is noted that uplink ACK/NACK transmission timing (i.e., uplink subframe #3) for a downlink subframe #8 of the (secondary) component carrier #2 is not matched with uplink ACK/NACK transmission timing (i.e., uplink subframe #2) corresponding to the (primary) component carrier #0 and the (secondary) component carrier #1.

Accordingly, solutions for effectively solving the problem of HARQ timing mismatch per cell or component carrier will be described as suggested in A) and B) below, wherein the problem occurs as uplink-downlink subframe configurations per cell (or component carrier) are not matched with one another in the backhaul link.

A) When the carrier aggregation scheme is applied to the backhaul link and the number of cells (or component carriers) allocated to a specific relay node is N, DL/UL subframe set of subframe configuration allocated to PCell (i.e., downlink component carrier #0 and uplink component carrier #0) is defined as P (i.e., $P=S_0$), and downlink/uplink subframe set of subframe configuration allocated to SCell #k except for PCell is defined as $S_k$ ($0 \leq k \leq (N-1)$). In this case, subframe configuration per cell (or component carrier) in the backhaul link is designated to obtain a relation of $S_k \subset P$ ($0<k\leq(N-1)$).

In this case, $S_k \subset P$ defined as above may mean a subsumption relation only on the uplink/downlink subframe set between PCell and SCell, or may mean a subsumption relation on a set of uplink subframes only or a set of downlink subframes only.

Alternatively, $S_k \subset P$ defined as above may mean a subsumption relation only on HARQ timing, i.e., "uplink ACK/NACK timing", "PHICH timing" or "uplink ACK/NACK and PHICH timing". Moreover, Sk ⊂ P defined as above may mean a subsumption relation on HARQ timing (i.e., subsumption relation on "uplink ACK/NACK timing", "PHICH timing" or "uplink ACK/NACK and PHICH timing") as well as the subsumption relation (or subsumption relation of uplink subframes only or subsumption relation of downlink subframes only) on uplink/downlink subframe sets between PCell and SCell. In this case, the subsumption relation on HARQ timing means that PCell may ensure HARQ timing of SCell without any change or with a minimum change. For example, SCell where change of HARQ timing occurs may follow HARQ timing of PCell.

Also, only if a corresponding CC (or cell) having SIB2 linkage between DL CC and UL CC is allocated to the relay node, both uplink subframes and downlink subframes may be designated. In other cases, only one type of uplink subframes and downlink subframes may be designated.

The following Table 3 illustrates an example of allocation of uplink-downlink subframe configuration (i.e., SubframeConfigurationTDD) per cell (or component carrier) in the backhaul link in accordance with the above solution A).

TABLE 3

| SubframeConfigurationTDD of PCell | SubframeConfigurationTDD candidates of SCell |
|---|---|
| 0 | 0 |
| 1 | 1, 13 |
| 2 | 0, 2 |
| 3 | 1, 3, 13 |
| 4 | 0, 1, 4, 13 |
| 5 | 5 |
| 6 | 6 |
| 7 | 5, 7 |
| 8 | 6, 8 |
| 9 | 5, 7, 9 |
| 10 | 6, 8, 10 |
| 11 | 1, 11, 13, 14 |
| 12 | 1, 11, 12, 13, 14, 15, 16 |
| 13 | 1, 13 |
| 14 | 1, 11, 13, 14 |
| 15 | 1, 13, 15 |
| 16 | 1, 11, 12, 13, 14, 15, 16 |
| 17 | 1, 3, 11, 12, 13, 14, 15, 16, 17 |
| 18 | 18 |

B) as another solution, when the number of total cells (or component carriers) allocated to a relay node (RN) in a TDD system is N, backhaul link subframe configuration (i.e., SubframeConfigurationTDD of Table 1) that may be allocated to each cell (or component carrier) may be limited to the same eNB-RN uplink-downlink configuration in the solution A).

The following Table 4 illustrates an example of allocation of uplink-downlink subframe configuration (i.e., SubframeConfigurationTDD) per cell (or component carrier) in the TDD system in accordance with the solution B).

TABLE 4

| eNB-RN uplink-downlink configuration | SubframeConfigurationTDD of PCell | SubframeConfigurationTDD candidates of SCell |
|---|---|---|
| 1 | 0 | 0 |
|  | 1 | 1 |
|  | 2 | 0, 2 |
|  | 3 | 1, 3 |
|  | 4 | 0, 1, 4 |
| 2 | 5 | 5 |
|  | 6 | 6 |
|  | 7 | 5, 7 |
|  | 8 | 6, 8 |
|  | 9 | 5, 7, 9 |
|  | 10 | 6, 8, 10 |
| 3 | 11 | 11 |
|  | 12 | 11, 12 |
| 4 | 13 | 13 |
|  | 14 | 13, 14 |

TABLE 4-continued

| eNB-RN uplink-downlink configuration | SubframeConfigurationTDD of PCell | SubframeConfigurationTDD candidates of SCell |
|---|---|---|
|   | 15 | 13, 15 |
|   | 16 | 13, 14, 15, 16 |
|   | 17 | 13, 14, 15, 16, 17 |
| 6 | 18 | 18 |

Uplink-downlink (backhaul link) subframe configuration per cell (or component carrier) set based on the A) or B) may be reported from the eNB to the RN through RN specific upper layer signaling, SIB, or physical layer signal (based on a specific period previously defined, or at a specific time), or may be updated.

Additionally, when cross carrier scheduling for PDSCH transmission is performed for SCell at a backhaul downlink subframe #m set to the PCell on the basis of the A) or B), a downlink subframe per SCell that may be a target of cross carrier scheduling may be limited to that such as (1) and (2) as follows.

(1) First of all, the downlink subframe per SCell that may be a target of cross carrier scheduling may be limited to a downlink subframe of SCell set to the backhaul downlink subframe at the same time as the backhaul downlink subframe #m of the PCell. This is the limitation that may be applied to both the FDD system and the TDD system. In this case, uplink ACK/NACK transmission for PDSCH transmission of the SCell cross carrier scheduled from the PCell depends on uplink ACK/NACK transmission time for the backhaul downlink subframe #m of the PCell, and is performed through an uplink primary component carrier (UL PCC) of the PCell.

(2) Also, in case of the TDD system, when cross carrier scheduling is performed, downlink subframe for transmitting uplink grant per SCell satisfies the aforementioned limitation (1), and at the same time is a downlink subframe that enables uplink grant transmission under the subframe configuration of the corresponding SCell and may be limited to a case where uplink subframe (for PUSCH transmission) associated with the downlink subframe is set to the backhaul uplink subframe. This is because that the position of the uplink subframe is fixed per subframe configuration in the TDD system and if this condition is not satisfied, PUSCH transmission cannot be performed.

On the other hand, in case of the FDD system, downlink subframe for uplink grant transmission, which may be a target of cross carrier scheduling per SCell, is possible at the downlink subframe based on the above limitation (1). In this case, respective uplink-downlink subframe configurations may be applied to all the cells (or component carriers) independently, or the same uplink-downlink subframe configuration may be applied to some cells (or component carriers) and respective uplink-downlink subframe configurations may be applied to the other cells (or component carriers).

Figure 11:
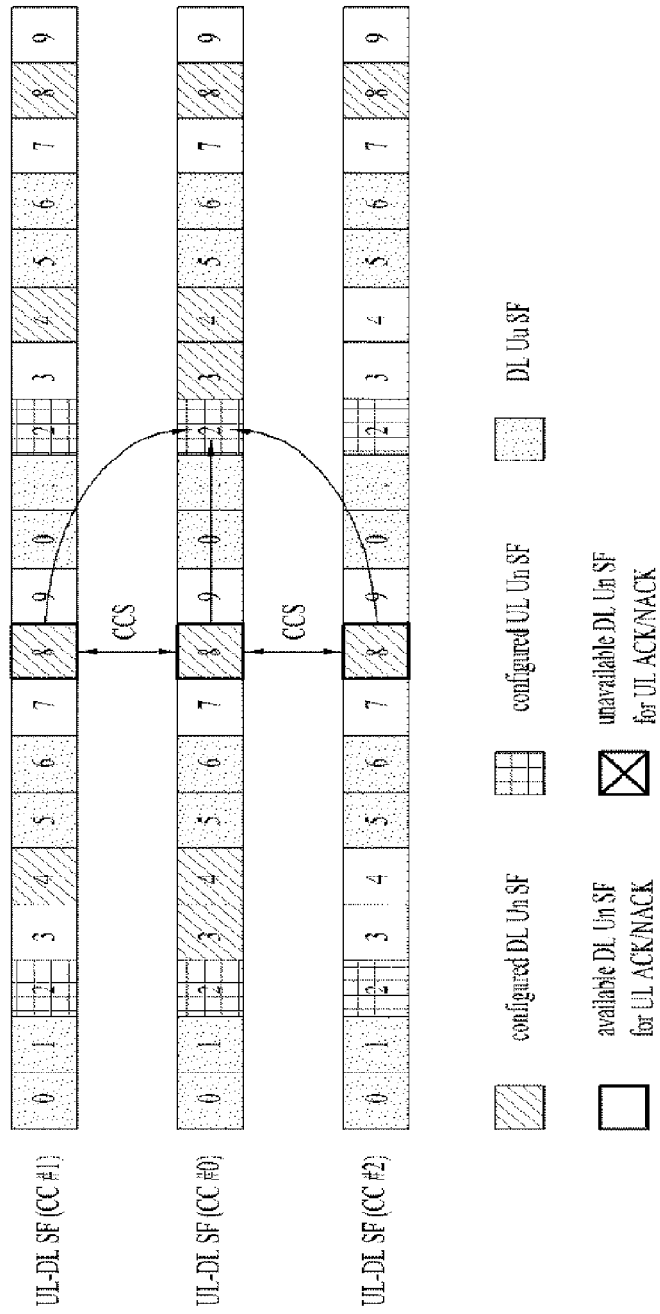
FIG. 11 is a diagram illustrating an application example of subframe configuration for cross carrier scheduling in accordance with the embodiment of the present invention.

FIG. 11 is a diagram illustrating an application example of subframe configuration for cross carrier scheduling in accordance with the embodiment of the present invention. In particular, the embodiment of the present invention is applied to FIG. 11 under the same status of FIG. 9 and FIG. 10. However, SubframeConfigurationTDD of cell (or component carrier (CC)) #0, cell (or component carrier (CC)) #1, and cell (or component carrier (CC)) #2 have been set to "9", "7" and "5", respectively.

Referring to FIG. 11, SubframeConfigurationTDD of cell (or component carrier) #2 is set to 5 to obtain relations of $S2 \subset P$ and $S1 \subset P$, whereby it is noted that uplink ACK/NACK transmission timing of a downlink component carrier #8 of cell (or component carrier) #2 becomes the same as that of uplink subframe #2 in case of cell (or component carrier) #0 and cell (or component carrier) #1.

Accordingly, uplink ACK/NACK signals for PDSCH transmitted through the downlink subframe #8 of cells (or component carriers) #0, #1 and #2 may be transmitted together through PUCCH of an uplink subframe #2 of cell (or component carrier) #0.

The aforementioned embodiment of the present invention may be applied to both the FDD system and the TDD system.

Also, the aforementioned embodiment of the present invention may be applied to an environment where some of cells (or component carriers) allocated to the relay node are operated in accordance with 'in-band (i.e., half duplex mode)' and the other cells are operated in accordance with 'out-band (i.e., full duplex mode)' as well as the environment where the cells (or component carriers) allocated to the relay node are operated in accordance with 'in-band'.

Furthermore, the aforementioned embodiment of the present invention may be applied to both an operation of a backhaul link between the macro base station and the relay node and an operation of an access link between the relay node and the relay user equipment. Additionally, the aforementioned embodiment of the present invention may be applied to the operation between the macro base station and the user equipment (MUE) of the macro base station. In other words, in the FDD system, all the downlink subframes may be candidates of downlink subframes that may be used for communication between the macro base station and the MUE. In the TDD system, all the downlink subframes may be applied to the existing uplink-downlink subframe configuration as illustrated in Table 5 below. Moreover, the present invention may be applied to a case of a dynamic subframe (SF) configuration system that dynamically changes usage of a specific frame in accordance with change of traffic load on the current system.

TABLE 5

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Figure 12:
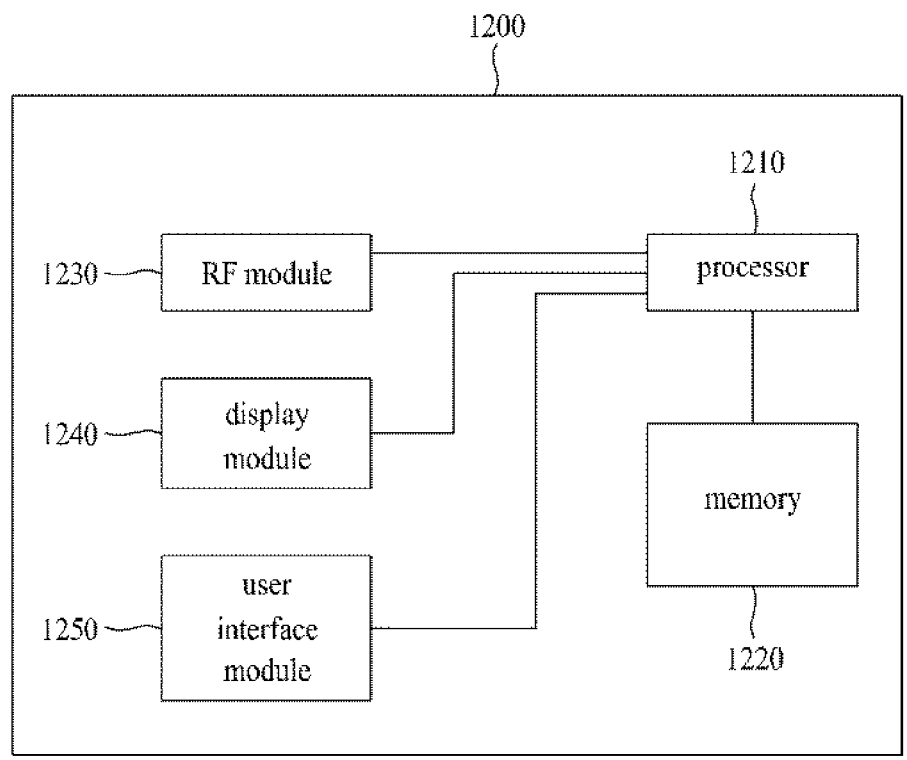
FIG. 12 is a block diagram illustrating a communication apparatus according to one embodiment of the present invention.

FIG. 12 is a block diagram illustrating a communication apparatus according to one embodiment of the present invention.

Referring to FIG. 12, the communication apparatus 1200 includes a processor 1210, a memory 1220, a radio frequency (RF) module 1230, a display module 1240, and a user interface module 1250.

The communication apparatus 1200 is illustrated for convenience of description, and some of its modules may be omitted. Also, the communication apparatus 1200 may further include necessary modules. Moreover, some modules of the communication apparatus 1200 may be divided into segmented modules. The processor 1210 is configured to perform the operation according to the embodiment of the present invention illustrated with reference to the drawings. In more detail, the detailed operation of the processor 1210 will be understood with reference to the description of FIG. 1 to FIG. 11.

The memory 1220 is connected with the processor 1210 and stores an operating system, an application, a program code, and data therein. The RF module 1230 is connected with the processor 1210 and converts a baseband signal to a radio signal or vice versa. To this end, the RF module 1230 performs analog conversion, amplification, filtering and frequency uplink conversion, or their reverse processes. The display module 1240 is connected with the processor 1210 and displays various kinds of information. Examples of the display module 1240 include, but not limited to, well-known elements such as a liquid crystal display (LCD), a light emitting diode (LED), and an organic light emitting diode (OLED). The user interface module 1250 is connected with the processor 1210, and may be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the relay node and the base station. A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point.

The embodiments according to the present invention may be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although it has been described that the method for configuring a backhaul link subframe in a wireless communication system to which a carrier aggregation scheme is applied and the apparatus for the same have been applied to the 3GPP LTE system, the method and the apparatus may be applied to various wireless communication systems in addition to the 3GPP LTE system.

The invention claimed is:

1. A method for processing signals at a user equipment (UE) in a Time Division Duplex (TDD) wireless communication system, the method comprising:
    receiving, from a base station (BS), a control signal in a downlink subframe via a first cell configured with a first subframe configuration;
    receiving, from the BS, a data signal based on the control signal in the downlink subframe via a second cell configured with a second subframe configuration that is a different subframe configuration than the first subframe configuration; and
    transmitting, to the BS in an uplink subframe, a response signal corresponding to the data signal,
    wherein a relationship between the downlink subframe and the uplink subframe is defined based on the first subframe configuration.

2. The method of claim 1, wherein the downlink subframe has an index #(n−k) and the uplink subframe has an index #n, and k is an integer determined based on the first subframe configuration.

3. The method of claim 1, wherein the control signal includes a carrier indicator field (CIF) identifying the second cell.

4. The method of claim 1, wherein the control signal includes scheduling information for receiving the data signal via the second cell.

5. The method of claim 1, further comprising:
    receiving, from the BS, information on the first subframe configuration and the second subframe configuration via a Radio Resource Control (RRC) layer signaling.

6. A method for processing signals at a base station in a Time Division Duplex (TDD) wireless communication system, the method comprising:
    transmitting, to a user equipment (UE), a control signal for a data signal in a downlink subframe via a first cell configured with a first subframe configuration;
    transmitting, to the UE, the data signal in the downlink subframe via a second cell configured with a second subframe configuration that is a different subframe configuration than the first subframe configuration; and receiving, from the UE in an uplink subframe, a response signal corresponding to the data signal, wherein a relationship between the downlink subframe and the uplink subframe is defined based on the first subframe configuration.

7. The method of claim 6, wherein the downlink subframe has an index #(n−k) and the uplink subframe has an index #n, and k is an integer determined based on the first subframe configuration.

8. The method of claim 6, wherein the control signal includes a carrier indicator field (CIF) identifying the second cell.

9. The method of claim 6, wherein the control signal includes scheduling information for receiving the data signal via the second cell at the UE.

10. The method of claim 6, further comprising:

transmitting, to the UE, information on the first subframe configuration and the second subframe configuration via a Radio Resource Control (RRC) layer signaling.

\* \* \* \* \*